(12) United States Patent
Bennett

(10) Patent No.: US 8,015,647 B2
(45) Date of Patent: Sep. 13, 2011

(54) EXTENDED SAFETY CAGE FOR RETRACTABLE GANGWAY

(75) Inventor: Ronald W. Bennett, Florence, SC (US)

(73) Assignee: Aluminum Ladder Company, Florence, SC (US)

( * ) Notice: Subject to any disclaimer, the term of this patent is extended or adjusted under 35 U.S.C. 154(b) by 81 days.

(21) Appl. No.: 12/574,241

(22) Filed: Oct. 6, 2009

(65) Prior Publication Data
US 2011/0078864 A1   Apr. 7, 2011

(51) Int. Cl.
*E04G 1/22* (2006.01)
(52) U.S. Cl. ............... 14/37; 14/71.1; 182/143
(58) Field of Classification Search ........... 14/69.5–72.5
See application file for complete search history.

(56) References Cited

U.S. PATENT DOCUMENTS

| | | | | |
|---|---|---|---|---|
| 298,212 A * | 5/1884 | Knight | .............. | 182/1 |
| 2,362,170 A * | 11/1944 | Swaisgood | ............ | 182/1 |
| 3,641,604 A * | 2/1972 | Eggert, Jr. | .............. | 14/71.5 |
| 4,363,150 A * | 12/1982 | Nilsson | ............ | 14/69.5 |
| 4,679,657 A | 7/1987 | Bennett et al. | ............. | 182/113 |
| 5,042,612 A | 8/1991 | Bennett et al. | ............. | 182/1 |
| 5,299,653 A * | 4/1994 | Nebel | .............. | 182/2.7 |
| 5,392,878 A * | 2/1995 | Bennett et al. | ............. | 182/115 |
| 6,390,152 B1 | 5/2002 | Donovan et al. | ........... | 141/279 |
| 6,405,831 B1 | 6/2002 | Daniel, III | ............. | 182/127 |
| 6,923,140 B1 | 8/2005 | Cook | .............. | 114/362 |
| 7,069,611 B2 * | 7/2006 | Larson | .............. | 14/71.3 |
| 7,140,467 B2 | 11/2006 | Cook | .............. | 182/143 |
| 7,216,741 B2 * | 5/2007 | MacDonald et al. | ......... | 182/113 |
| 7,350,254 B2 * | 4/2008 | Boulton | ............ | 14/2.4 |
| 7,435,034 B2 * | 10/2008 | Scott et al. | ............. | 404/35 |
| 2003/0145400 A1 * | 8/2003 | Hinkle | ............ | 14/71.5 |
| 2007/0125600 A1 | 6/2007 | Bennett et al. | ............. | 182/36 |

* cited by examiner

*Primary Examiner* — Raymond Addie
(74) *Attorney, Agent, or Firm* — Amy Allen Hinson; Nexsen Pruet, LLC

(57) ABSTRACT

An extended safety cage provides access to a plurality of hatches on the top of a mobile container. The cage is rotatably attached to the end of a gangway, which extends from and is rotatably attached to a platform. The platform carries a pair of braces that extend out in opposite directions and support the cage through spring-loaded lifting arms. The apparatus can include actuators, such as hydraulic or pneumatic actuators, that urge the gangway and cage downward when activated. Secondary braces ensure that the lifting arms and safety cage move in unison.

19 Claims, 4 Drawing Sheets

EXTENDED SAFETY CAGE FOR RETRACTABLE GANGWAY

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO A SEQUENCE LISTING, A TABLE, OR A COMPUTER PROGRAM LISTING COMPACT DISC APPENDIX

Not Applicable.

FIELD OF THE INVENTION

When loading tanks of transport trucks it is necessary for a workman to open the hatches on the tank prior to loading and to close the hatches after loading. The hatches are typically spaced apart along the top surface of the tank. The top surface of the tank is cylindrical and may be slippery, which presents a hazardous condition for the workman.

If a retractable cage is used to provide fall protection while the workman is addressing each hatch, the cage must be placed over one hatch at a time. This typically means that, after the workman is finished with one hatch, he must exit the cage, raise the cage, move the cage along the length of the tank to the next hatch, lower the cage over the next hatch, and reenter the cage to access the hatch. Alternatively, instead of moving the cage from one hatch to the next, the tank can be moved beneath the cage. Both of these alternatives, however, are time consuming. Thus, a need exists for a retractable fall protection cage that provides simultaneous access to all of the hatches on a tank. There is also a need for such a fall protection cage that can be used with existing short length platforms (e.g., platforms approximately as wide as a typical gangway).

SUMMARY OF THE INVENTION

The present invention includes an extended safety cage accessible through a retractable gangway. The gangway extends out from a platform, to which it is attached at one of its ends. The extended cage is attached to the other end of the gangway. The cage is also supported by the platform, through cantilevered braces and lifting arms. The cantilevered braces extend outwardly from the platform in opposing directions and parallel to the longitudinal dimension of the extended cage.

Rotatably attached to the distal ends of the braces are lifting arms, which span from the braces to the cage and urge the cage upward. Secondary braces, also parallel to the main braces and the cage, span between the gangway and the lifting arms to ensure that the lifting arms and gangway all move in unison and that the cage remains level at all times. Linear actuators can be used to lower the gangway and cage and tracking gates can be used to adjust the effective length of the cage.

The braces and lifting arms permit the present invention to be used on existing short length platforms without requiring that the platform be extended and without requiring the construction of additional columns for supporting the ends of the cage. Likewise, the braces and lifting arms allow the extended cage to be employed on new construction in situations in which it is inconvenient or otherwise undesirable to build an extended platform.

Other features and advantages of the present invention will be apparent to those skilled in the art from a careful reading of the Description of Embodiments of the Invention presented below and accompanied by the drawings.

DESCRIPTION OF EMBODIMENTS OF THE INVENTION

The present invention relates to extended fall protection cages accessible through retractable gangways. Although primarily described herein in terms of its use with tank trucks, it will be clear that the present invention can also be used in connection with a variety of other mobile containers (including but not limited to railroad tank cars and shipping containers) to provide safe access to all of the hatches on the top of the container.

Figure 1:
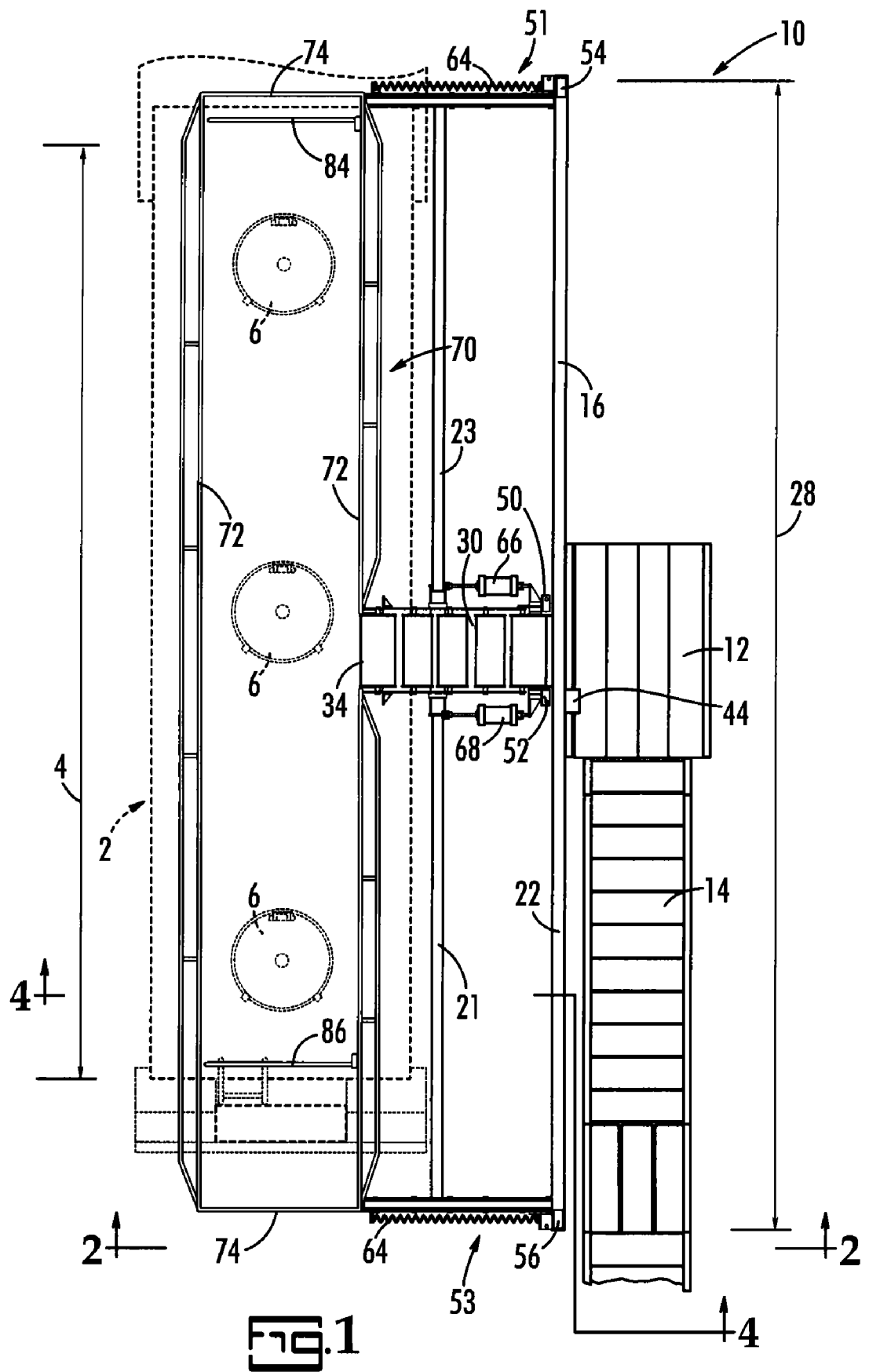
FIG. 1 is a plan view of the extended cage with the retractable gangway in the extended position according to one embodiment of the invention.

FIG. 1 illustrates a plan view of a bulk material tank truck 2 positioned for servicing at a hatch opening and closing station 10, which includes a raised platform 12, accessible through ladder 14. Tank truck 2 has three hatches 6, through which bulk materials can be added or removed. In order to enhance the safety of workmen who open and close the hatches 6, an extended cage 70 is provided, which is designed to be placed in encompassing relation to the hatches 6. The safety cage 70 is a quadrilateral shaped enclosure generally comprised of two long sides 72 and two shorter sides 74 and is accessible through a gangway 30. Gangway 30 is attached at one end to platform 12. The cage 70 is attached at the other, free end 34 of gangway 30, at which point there is a worker access opening in one of the long sides 74 of cage 70.

Figure 2:
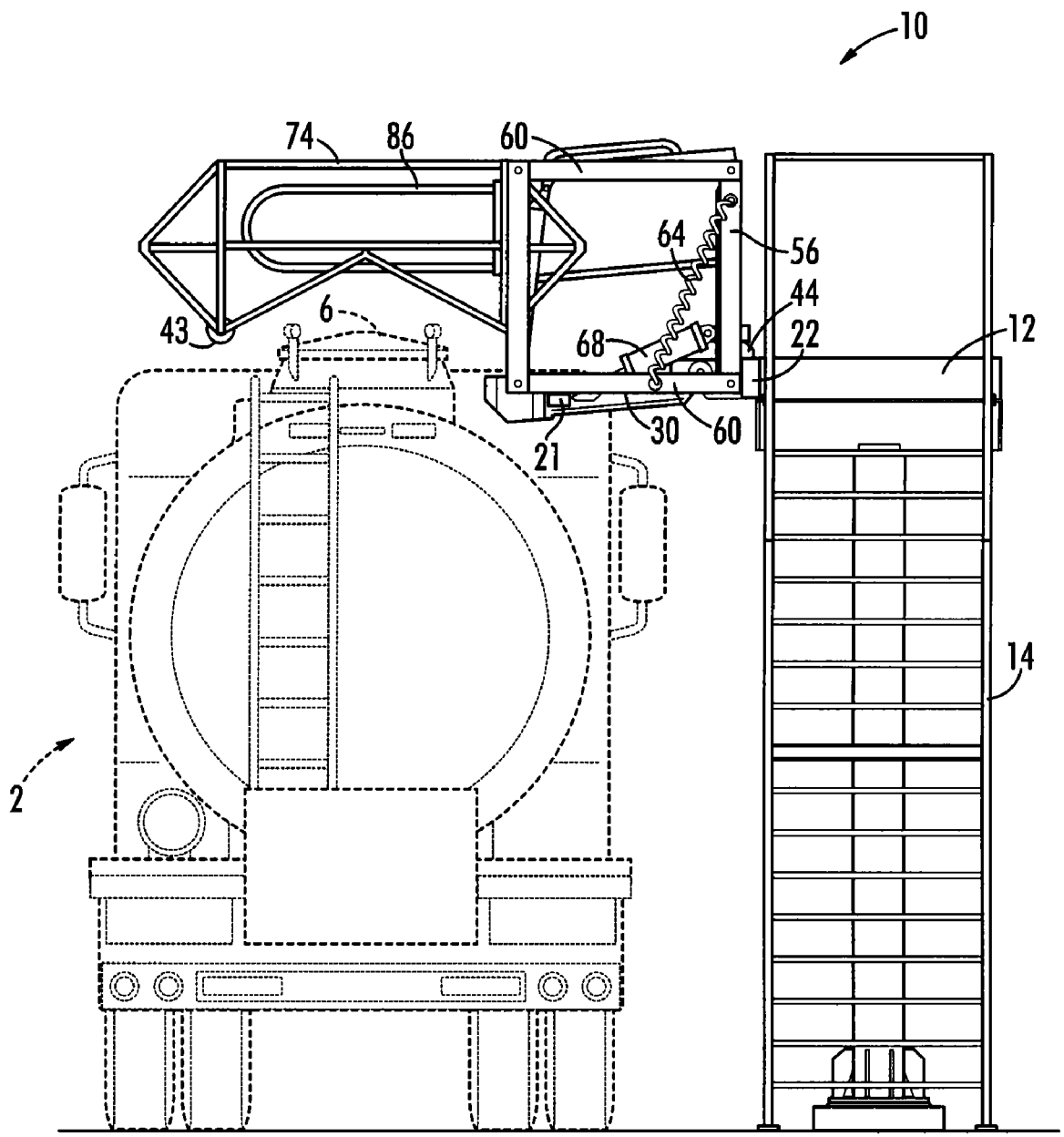
FIG. 2 is a side view of the extended cage and retractable gangway taken at 2-2 in FIG. 1 and showing the gangway in the extended position according to one embodiment of the invention.
Figure 3:
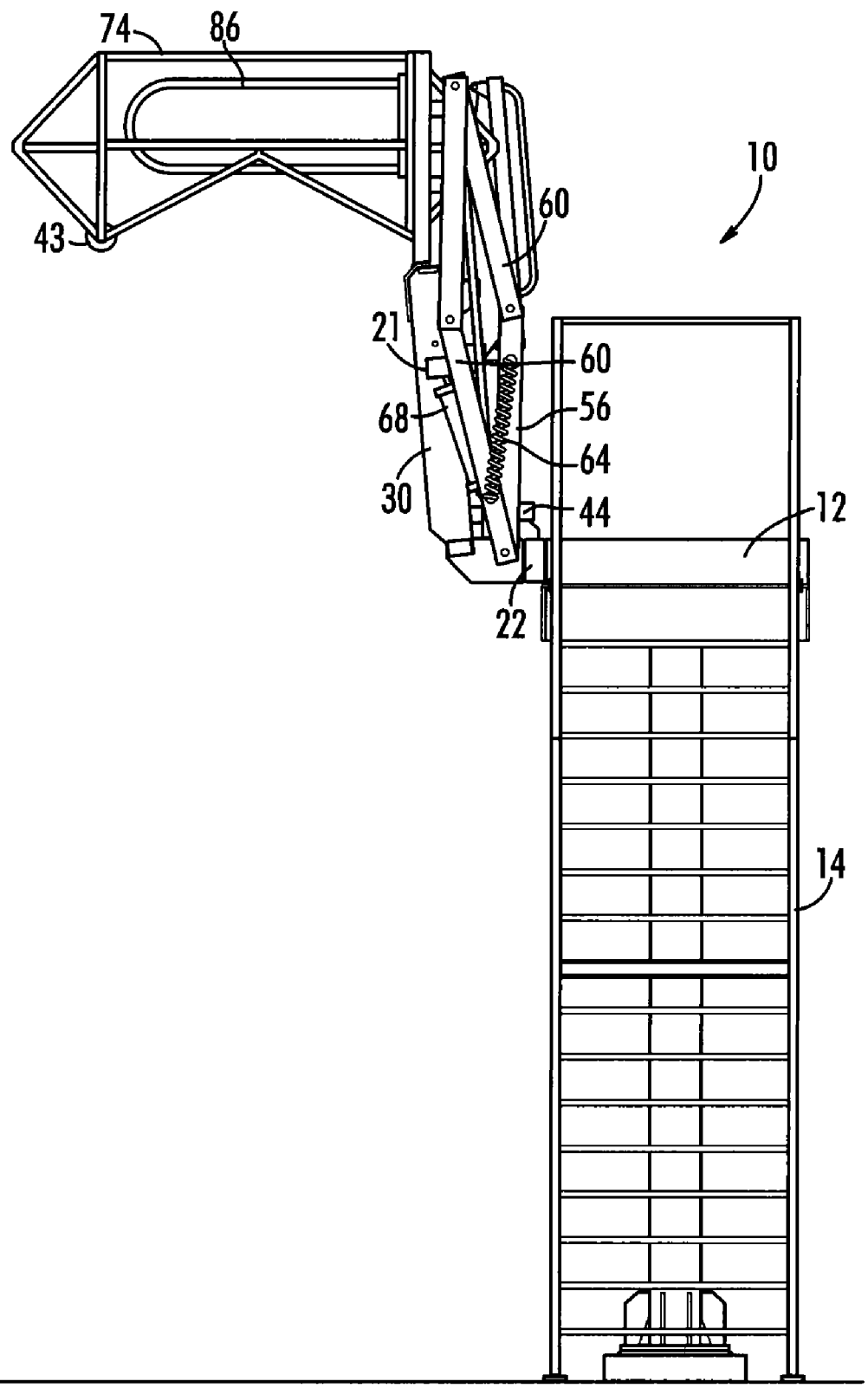
FIG. 3 is a side view of the extended cage and retractable gangway showing the gangway in the retracted position according to one embodiment of the invention.
Figure 4:
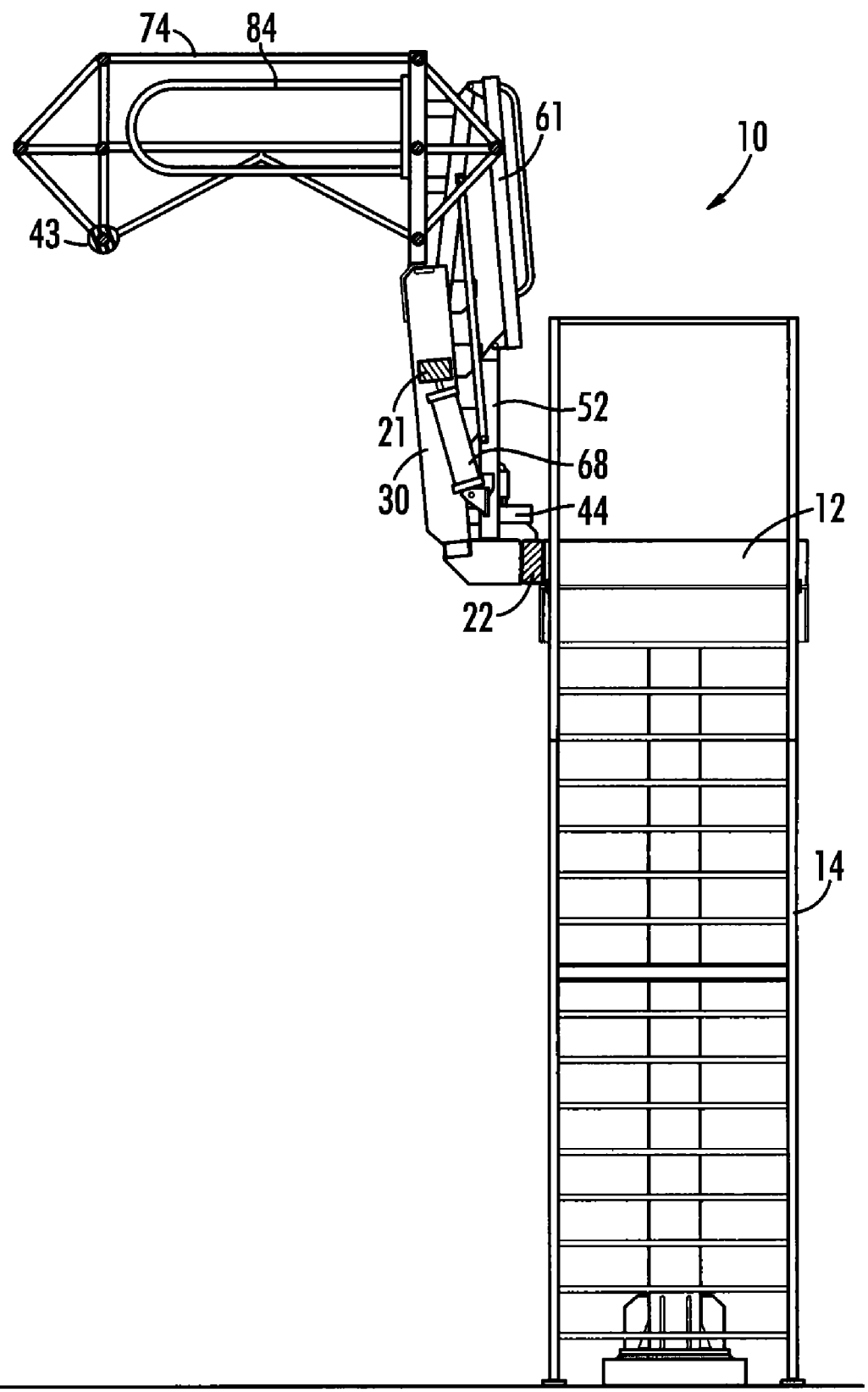
FIG. 4. is a cross-sectional view of the retractable gangway and fall protection cage taken at 4-4 in FIG. 1 and showing the gangway in the retracted position according to one embodiment of the invention.

The gangway 30 can be in the form of an access stairway having a pair of side rails with self leveling steps therebetween, but can also be a ramp or other walkway mounted between side rails. Gangway 30 is rotatably attached to platform 12 so that free end 34 of gangway 30 can be rotated in a vertical plane from a lowered position (see FIG. 2) to a substantially vertical raised position (see FIG. 3). Note that cage 70 does not rotate when it is retracted but remains level at all times. As shown in FIGS. 2 through 4, the cage 70 can also be outfitted with padding 43 on its lower-most surfaces (see FIGS. 2 and 3) to ensure that cage 70 does not damage or mar the surface of the tank truck 2.

Referring again to FIG. 1, extending in opposing directions from platform 12 and parallel to extended cage 70 are braces 16 and 22. In this particular embodiment, braces 16 and 22 are two halves of a single long brace, but the braces could, alternatively, be two separate pieces, both attached to platform 12. Note that braces 16 and 22 span a length 28 that is substantially as long as or longer than the length 4 of the container of tank truck 2. Note also that braces 16 and 22 are not supported at their distal ends but are cantilevered out from platform 12.

At the distal ends of braces 16 and 22 are outboard uprights 54 and 56 (see FIGS. 1 and 2). Braces 16 and 22 and outboard uprights 54 and 56 carry lifting arms 51 and 53, respectively. Lifting arms 51 and 53, which are rotatably attached to braces 16 and 22, are comprised of parallel linkages 60 (see FIGS. 2 and 3) and include springs 64 that urge the lifting arms 51 and 53 upward. Lifting arms 51 and 53, in turn, urge cage 70 upward and toward its raised position (as shown in FIG. 3).

There are a number of configurations suitable for using springs 64 in conjunction with parallel linkages 60 to urge one end of the parallel linkages 60 in a certain direction. The configuration shown in the drawings (specifically FIG. 2) is but one of these configurations and the present invention is not to be limited to only the illustrated configuration. All configurations known in the art are intended to be encompassed by the present invention and the description and drawings should not be deemed to narrow the scope of the present invention in any way.

In addition to outboard uprights 54 and 56, inboard uprights 50 and 52 can also be carried by the platform 12, either directly or through braces 16 and 22. The inboard uprights 50 and 52 can serve to support railing 61 (FIG. 4) on gangway 30 as well as optional actuating cylinders 66 and 68. In this particular embodiment, actuating cylinders 66 and 68 are used to force gangway 30 downward, overcoming the force of springs 64 at lifting arms 51 and 53. Actuating cylinder 66 can be attached between inboard upright 50 and gangway 30 and actuating cylinder 66 can be attached between inboard upright 52 and gangway 30. When the actuating cylinders 66 and 68 are extended, the gangway 30 and cage 70 are pushed downward, toward tank truck 2. When the actuating cylinders 66 and 68 are retracted, the gangway 30 and cage 70, under the urging of springs 64, are permitted to rise toward the upright position (see FIG. 3).

As with springs 64 and parallel linkages 60, there are a number of configurations suitable for using actuating cylinders 66 and 68 in conjunction with the gangway 30 or components attached to the gangway 30 to lower the gangway 30 and cage 70. The configuration shown in the drawings is but one of these configurations and the present invention is not to be limited to only the illustrated configuration. All configurations known in the art are intended to be encompassed by the present invention and the description and drawings should not be deemed to narrow the scope of the present invention in any way as it relates to using actuating cylinders to lower the gangway 30 and cage 70.

Actuating cylinders 66 and 68 can be any type of actuator known in the art, including but not limited to hydraulic actuators or pneumatic actuators. A rotary actuator could also be used. Any actuator capable of urging gangway 30 downward could be used as part of the present invention and the present invention should not be seen as limited to linear actuators. Furthermore, the present invention includes an embodiment that does not use actuators of any kind to lower gangway 30 but simply relies upon the strength or weight of the user to force the gangway 30 downward thereby lowering the cage 70. Accordingly, the present invention includes an embodiment in which the user, while standing on the platform 12 or by stepping on gangway 30 forces the gangway 30 downward thereby putting cage 70 into the lowered position over tank truck 2.

The present invention can also include secondary braces 21 and 23, which span between the gangway 30 and the lifting arms 51 and 53, as shown in FIG. 1. Secondary braces 21 and 23 ensure that gangway 30 and the lifting arms 51 and 53 move in unison, keeping the cage 70 level at all times.

The present invention can also include a lock, including a foot-activated lock 44, which holds the cage 70 in a fixed position until released by a user. Typically, the lock 44 is in communication with the gangway 30 but could, alternatively, be in communication with one or more lifting arms 51 and 53. The lock can be a mechanical lock, an electro-mechanical lock, a hydraulic lock, a pneumatic lock, or any other lock known in the art. Accordingly, the user can, while standing on the platform 12, lower the gangway 30 and cage 70 and then, prior to stepping onto gangway 30, lock the gangway 30 and cage 70 in position to ensure that they do not move while the user is on the gangway 30 or on the tank truck 2. Also, the gangway 30 and cage 70 could be locked in a stowed position as shown in FIG. 3.

The present invention can also include one or more tracking gates 84 and 86 (see FIGS. 1-3). Tracking gates 84 and 86 are mobile portions of railing that extend across cage 70 and can be moved along a portion of the length of cage 70. They can thereby be used to vary the effective length of cage 70. Note that, in FIG. 1, tracking gate 84 is near one end 74 of cage 70 while tracking gate 86 has been moved away from the other end 74 of cage 70 to prevent a user from falling behind tank truck 2. Accordingly, tracking gates 84 and 86 can be used to adapt cage 70 for use with tank trucks that are substantially shorter than cage 70, but still have more than one access hatch.

Tracking gates 84 and 86 can be attached to a side of the cage 70 by any means known in the art and can be moved longitudinally by any means known in the art, including but not limited to hydraulically, pneumatically, or electrically. By way of example and not limitation, the tracking gates could be driven longitudinally with a chain or belt. Alternatively, tracking gate 84 and 86 could be slidably attached to cage 70 and lockable thereon. Thus the user could move the tracking gates 84 and 86 without the assistance of any actuator or powered mechanical system.

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. In fact, after reading the above description, it will be apparent to one skilled in the relevant art(s) how to implement the invention in alternative embodiments. Thus, the present invention should not be limited by any of the above described exemplary embodiments.

In addition, it should be understood that the figures, which highlight the functionality and advantages of the present invention, are presented for purposes of example only. The architecture of the present invention is sufficiently flexible and configurable, such that it may be used in ways other than that shown in the accompanying figures.

Further, the purpose of the Abstract of the Disclosure is to enable the U.S. Patent and Trademark Office and the public generally, and especially the scientists, engineers, and practitioners in the art who are not familiar with patent or legal terms or phraseology, to determine quickly from a cursory inspection the nature and essence of the technical disclosure of the application. The Abstract of the Disclosure is not intended to be limiting as to the scope of the invention in any way.

What is claimed is:

1. An apparatus for providing safe access to a top of a mobile container, said mobile container having a top, a longitudinal dimension, and a plurality of hatches arrayed along said longitudinal dimension on said top, said apparatus comprising:
a raised platform;
a pair of braces carried by said platform and extending away from said platform in opposite directions from one another and parallel to said longitudinal dimension of said mobile container;
a gangway having a first end and an opposing second end, said first end of said gangway rotatably attached to said platform, said gangway extending laterally outward from said platform, said gangway rotatable in a vertical plane from a downward position to a substantially vertical upward position;
an extended cage attached to said second end of said gangway with an access opening at said second end of said gangway, said cage dimensioned to encompass all of said plurality of hatches simultaneously, said cage rotatable on said second end of said gangway so that said cage remains horizontal when said gangway is in said horizontal position and when said gangway is in said vertical position;
a pair of lifting arms rotatably attached to said pair of braces and said cage and urging said cage upward.

2. The apparatus of claim 1, further comprising:
a foot-activated lock in communication with said gangway so that said gangway can be locked in a particular position.

3. The apparatus of claim 1, further comprising:
a foot-activated lock in communication with said at least one lifting arm so that said at least one lifting arm can be locked in a particular position.

4. The apparatus of claim 1, wherein said cage has a bottom, said apparatus further comprising:
padding carried on said bottom of said cage, said padding protecting said container from said cage.

5. The apparatus of claim 1, further comprising:
at least one inboard upright carried by said platform;
at least one actuating cylinder in mechanical communication with said at least one inboard upright and said gangway so that, when said actuating cylinder is extended, said second end of said gangway and said cage are lowered.

6. The apparatus of claim 5 wherein said actuating cylinder is a pneumatic cylinder.

7. The apparatus of claim 5 wherein said actuating cylinder is a hydraulic cylinder.

8. The apparatus of claim 1, further comprising:
a pair of secondary braces attached to and spanning between said gangway and said lifting arms so that said gangway and said lifting arms move in unison.

9. The apparatus of claim 1, wherein said cage has a first side and an opposing second side, said second end of said gangway and said pair of lifting arms are attached to said second side of said cage.

10. The apparatus of claim 1, wherein said pair of braces extend the length of said cage.

11. The apparatus of claim 10, wherein said pair of lifting arms are each positioned at opposing outer ends of said braces.

12. A safety cage for providing fall protection to workers working on top of a mobile container having a plurality of hatches, said safety cage comprising:
a pair of spaced-apart, parallel long sides in opposed relation, one side of said pair of said long sides connected to an end of a gangway and having an access opening at said end of said gangway;
a pair of spaced-apart, parallel short sides in opposed relation, said short sides connecting said pair of long sides to create a quadrilateral; and
at least one tracking gate carried by said cage, said at least one tracking gate extending into said cage parallel to and between said pair of short sides and movable along said parallel long sides within said cage so that said cage can be dimensioned to encompass said plurality of hatches but not extend beyond said top of said mobile container.

13. The apparatus of claim 12, wherein said at least one tracking gate is two tracking gates.

14. The apparatus of claim 12, wherein when said tracking gate is parallel to said short sides said tracking gate is moved along said parallel long sides.

15. An apparatus for providing access to a top of a mobile container, said mobile container having a top, a longitudinal dimension, and a plurality of hatches arrayed along said longitudinal dimension on said top, said apparatus comprising:
a raised platform;
a pair of braces carried by said platform and extending away from said platform in opposite directions from one another and parallel to said longitudinal dimension of said mobile container;
a gangway having a first end and an opposing second end, said first end of said gangway rotatably attached to said platform, said gangway extending laterally outward from said platform, said gangway rotatable in a vertical plane from a downward position to a substantially vertical upward position;
an extended cage attached to said second end of said gangway with an access opening at said second end of said gangway, said cage dimensioned to encompass all of said plurality of hatches simultaneously, said cage rotatable on said second end of said gangway so that said cage remains horizontal when said gangway is in said horizontal position and when said gangway is in said vertical position;
a pair of outboard uprights extending upward from said pair of braces;
two pairs of parallel linkages connecting said outboard uprights to said cage;
a pair of springs spanning from said outboard uprights to said pairs of parallel linkages so that said pair of springs urge said cage upward;
a pair of inboard uprights extending upward from said platform; and
a pair of actuating cylinders connected to said pair of inboard uprights and said gangway so that, when said actuating cylinders are extended, said gangway is lowered and said cage encompasses all of said plurality of hatches.

16. The apparatus of claim 15, further comprising:
a pair of secondary braces extending between said gangway and said two pairs of parallel linkages so that said gangway and said two pairs of parallel linkages move in unison.

17. The apparatus of claim 15, wherein said pair of braces extend the length of said cage.

18. The apparatus of claim 17, wherein said pair of outboard uprights are each positioned at opposing outer ends of said braces.

19. A method of providing safe access to a mobile container, said mobile container having a top, a longitudinal dimension, and a plurality of hatches arrayed along said longitudinal dimension on said top, said method comprising:

provi­ding a raised platform adjacent to said top of said mobile container;

providing a pair of braces carried by said platform and extending away from said platform in opposite directions from one another and parallel to said longitudinal dimension of said mobile container;

providing a gangway having a first end and an opposing second end, said first end of said gangway rotatably attached to said platform, said gangway extending laterally outward from said platform, said gangway rotatable in a vertical plane from a downward position to a substantially vertical upward position;

providing an extended cage attached to said second end of said gangway with an access opening at said second end of said gangway, said cage dimensioned to encompass all of said plurality of hatches simultaneously, said cage rotatable on said second end of said gangway so that said cage remains horizontal when said gangway is in said horizontal position and when said gangway is in said vertical position;

providing a pair of lifting arms rotatably attached to said pair of braces and said cage and urging said cage upward;

providing at least one actuating cylinder between said gangway and said platform, said actuating cylinder positioned and dimensioned to urge said gangway downward when extended; and extending said actuating cylinder and thereby lowering said cage over said top of said mobile container so that said cage provides safe access to all of said plurality of hatches.

* * * * *